PHOTO MULTIPLIER TUBE.

HIGH VOLTAGE SUPPLY

Patented Feb. 24, 1953

2,629,824

UNITED STATES PATENT OFFICE 2,629,824

RADIATION MEASURING DEVICE

Robert Gordon MacKay and George Harrison McLaughlin, Toronto, Ontario, Canada, assignors to Sherritt Gordon Mines Limited, Toronto, Ontario, Canada, a corporation of Ontario Application December 6, 1949, Serial No. 131,316

2 Claims. (Cl. 250—27)

This invention relates to an instrument for detecting, counting and recording the radiations emanating from radio-active substances.

Instruments for detecting and counting the radiations emanating from radio-active substances are well known, particularly in the art of geophysical surveying for radio-active minerals. In general, the devices presently employed involve a tube having an ionization chamber filled with an inert gas, such as argon, and connected through an electrical circuit which includes vacuum tubes to a translating device such as a recording meter or head phones. The radiations emanating from radio-active substances are absorbed by the gas, and converted into electrical impulses which, in turn, may be translated into current which may be measured, or which may be converted into sound. These devices are generally classified as Geiger-Mueller type counters and are in relatively wide spread use in the search for radio-active minerals.

The Geiger-Mueller type of counter has the difficulty that the rate of absorption of the radiations emanating from the radio-active substances by the ionizing gas is relatively slow, due possibly to the low density of the gas. As a result of this low absorption rate, dependable signals can only be obtained when the instrument is at rest, or, at best, when moved very slowly, such as at a slow walking pace, over the area being surveyed.

An important object of this invention is to provide a counter for detecting at a high rate of speed radiations from radio-active substances whereby a rapid count of the radiations may be obtained as the instrument is moved rapidly over an area being examined for the presence of radio-active substances.

A further object of the invention is to provide a radio-active radiation counter which is readily portable and which is dependable in use through a range of movement from a position at rest to the speed of an aeroplane.

A still further object of the invention is to provide a radio-active radiation counter in which random impulses unrelated to the radiations of radio-active substances, such as cosmic rays or originating in the instrument itself, are cancelled or at least modified such that they do not affect the translating means to the extent that they are mistaken for signals emanating from a radio-active substance.

The device of the present invention for receiving, strengthening and translating radiations emanating from radio-active substances comprises, in general, at least two counterbalancing electrical circuits connected in parallel, each circuit comprising a scintillating crystal connected through an input circuit adapted to convert emanations from the crystal to electrical signals, an amplifying circuit and an integrating circuit adapted to sum the electrical signals and common translating means, each of said parallel circuits being adapted to modify random signals or impulses originating in an other circuit, and being adapted to strengthen the related signals received in common by the scintillating crystals.

An understanding of the manner in which the above and other objects of the invention may be attained may be had from the following description, reference being made to the accompanying drawing, in which.

Like reference characters refer to like parts throughout the specification and drawing.

Figure 1:
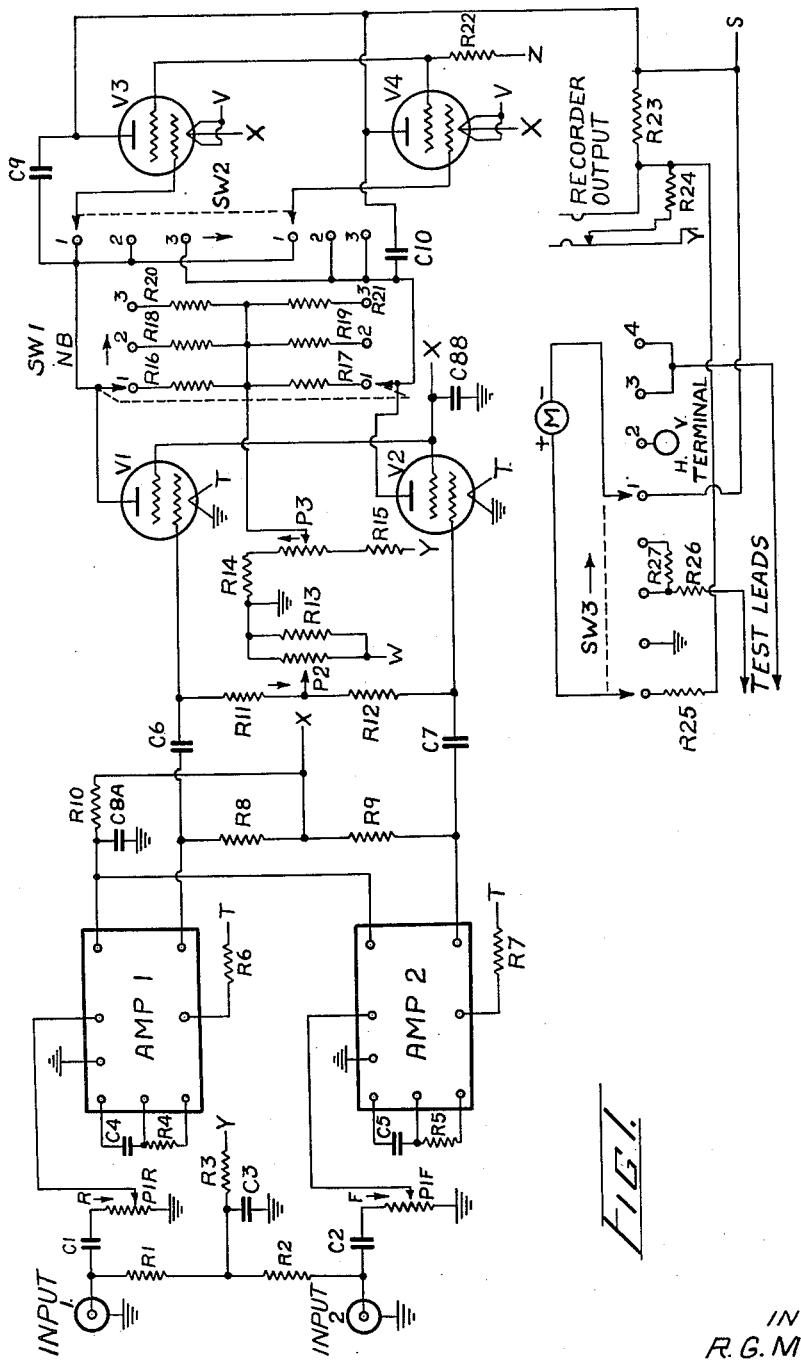
Figure 1 is a wiring diagram of an electrical circuit embodying the present invention.

The embodiment of the invention illustrated in the drawing comprises two electrical circuits, which are similar in every respect, connected in parallel and having a common translating device connected in series with the circuits. Each circuit comprises, in series, an input circuit, an amplifying circuit and an integrating circuit, the output stages of the latter circuits being connected in series with the translating device. For the purpose of description, only one circuit, the upper circuit illustrated in Figure 1, is described in detail with reference by bracketed numerals to the corresponding parts of the lower circuit.

Input circuit

Figure 2:
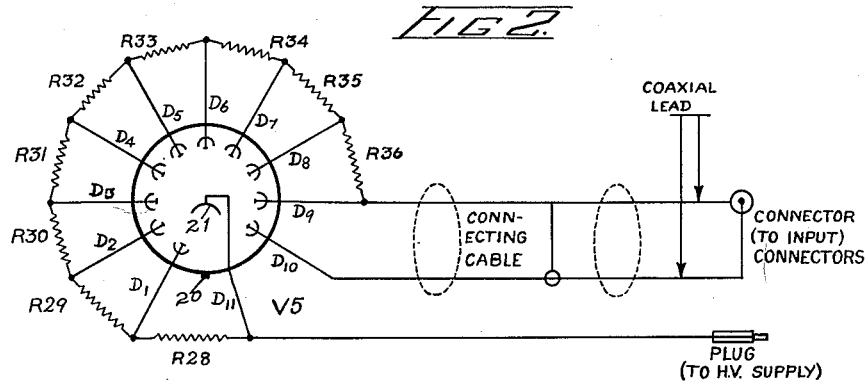
Figure 2 is a wiring diagram of one of the input circuits, including the scintillating crystal and the photo-multiplier tube.

Referring to the drawing, the numeral 20, Figure 2, indicates a crystal of the type adapted to receive radiations emanating from radio-active substances and transform the radiations into light. Many crystals have this property of transforming radio-active radiations into light rays, such as anthracene, naphthalene, and calcium tungstate, and are classified or known generally as scintillating crystals. Such crystals possess the very desirable property of having the capacity to detect radio-active radiations at a high rate of speed, many times the rate at which the radiations may be detected by a gas of the type employed in the conventional ionization chambers or the Geiger-Mueller type counters. This crystal is secured, such as by tape or by an adhesive, to the outer surface of a photo-multiplier tube, indicated by the numeral 21.

The photo-multiplier tube comprises a photo-sensitive surface 21 from which electrons are emitted by light falling on it, and a series of dynodes, $D_1$, $D_2$, $D_3$, $D_4$, $D_5$, $D_6$, $D_7$, $D_8$, $D_9$, and $D_{10}$. The dynodes are surfaces which on being bombarded by an electron give off a number of electrons. The light radiations from the scintillating crystal 20 are received on the photo-sensitive surface 21, transformed into electrons which are received and multiplied by the dynodes to generate an electrical impulse of sufficient strength to be passed to the amplifying circuit. For example, if five electrons are emitted by the photo-sensitive surface and these five electrons strike the first dynode, fifty ($5 \times 10$) electrons will be emitted by the first dynode and at every dynode each electron drives off ten more electrons. The total number of electrons in the output stage of, for example, a photo-multiplier tube having ten dynodes, from five electrons emitted by the cathode, or the photo-sensitive surface, would be $5 \times 10^{10}$. Thus the small amount of light reflected on the photo-sensitive surface of the cathode is developed into an appreciable electrical impulse in the output of the photo-multiplier tube. An input circuit, of course, forms part of each of the parallel circuits.

*Amplifier and integrating circuits*

The electrical impulses generated in the photo-multiplier tube are fed to the input side of the amplifier circuit. For the purpose of description, the upper circuit, Figure 1, is described, in detail with reference to the corresponding parts in the lower circuit.

Figure 3:
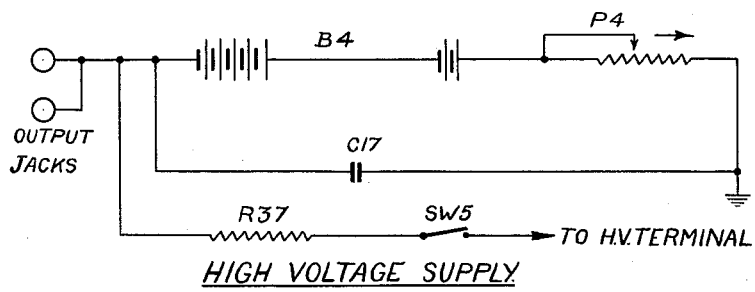
Figure 3 is a wiring diagram of the high voltage supply circuit.

Each amplifier circuit, Figure 1, of which there are two connected in parallel, comprises an input connection from the output side of the photo-multiplier tube connected through a blocking condenser, $C_1(C_2)$ and a resistor $R_1(R_2)$ to a potentiometer $P_1R(P_1F)$ which permits adjustment of the strength of the signal passed to the amplifier 1 (2). The purpose of this potentiometer is to enable the operator to set the gain of each circuit so that the response to any given radiation will be the same in the output stage of each parallel circuit. Power is supplied to the collector $D_{10}$ from a source of power Y, originating in the power circuit illustrated in Figure 4, through a filter circuit $R_3$—$C_3$. The adjusted signal is fed through a conventional amplifier 1 (2) in which the signal is amplified to increase the strength of the signal to the extent that it may be applied to the grid of vacuum tube $V_1(V_2)$. If the strength of the signal received from the photo-multiplier tube is sufficient to be applied directly to the grid of $V_1(V_2)$, the amplifier would be unnecessary. Voltage for amplifier 1 (2) is supplied at X, a wiring diagram of which is illustrated by Figure 3, to maintain a constant potential at condensor $C_6(C_7)$. When a signal is supplied to amplifier 1 (2) a change of voltage takes place across resistance $R_8(R_9)$. This change in voltage is applied across resistance $R_{11}(R_{12})$ through blocking condenser $C_6(C_7)$ to the grid of vacuum tube $V_1(V_2)$. Voltage is applied to W through resistance $R_{13}$ to potentiometer $P_2$ to permit changing the grid voltage of $V_1(V_2)$, and maintain the tube at cut-off.

When a signal is received and fed to the grid of $V_1(V_2)$ the tube conducts and the voltage at the plate is changed and changes the voltage across condensor $C_9(C_{10})$. A series of impulses from $C_1$, is integrated by the long time constant network $C_9(C_{10})$, $R_{16}(R_{17})$, $R_{18}(R_{19})$, $R_{20}(R_{21})$. Zero signal current through $V_3(V_4)$ is adjusted by the control $P_3$. Voltage is supplied at Y to $R_{15}$, $P_3$ and $R_{14}$.

The voltage change across $C_9$ is applied to the grid of $V_3$. The voltage change across $C_{10}$ is applied to the grid of $V_4$. This change in grid voltage $V_3$ ($V_4$) changes the plate current through $V_3$ ($V_4$) and the sum of the currents is fed into a translating device M.

In the operation of the instrument, when related equal signals are detected by the crystals and are multiplied in the photo-multiplier tubes, the resulting signals are then amplified through the amplifier stage and are fed to the grids of vacuum tubes $V_1$—$V_2$. This causes the tubes $V_1$—$V_2$ to conduct equally changing the voltage at condensers $C_9$—$C_{10}$. The voltage change is applied to the grids of $V_3$—$V_4$ producing a change in the plate currents resulting in a change in the sum of the currents fed to the recording meter M.

Each scintillating crystal is simultaneously exposed to the radiations emanating from radio-active substances. Thus, the impulses through the respective cricuits are approximately equal, and the strength of the current supplied to the translating device is the sum of the currents normally produced by the circuits plus the sum of the currents produced by the related impulses.

A problem in the operation of a single detecting, amplifying, integrating and translating circuit is that random noises or impulses unrelated to the radiations emanating from radio-active substances may be developed within the system itself, such as by vibration or from an external source such as cosmic rays. These random noises or unrelated impulses tend to apply impulses to the circuit which have the same effect on the translating device as that produced by the radio-active radiations. Thus, it is difficult, if not impossible to distinguish by means of the translating device, between the changes in current caused by radiations emanating from radio active substances and random noises or impulses which are entirely unrelated to the radiations from radio-active substances.

The provision of two or more detecting, amplifying, integrating and counterbalancing circuits connected in parallel with a common translating device connected in series with the output stages of the parallel circuits overcomes this difficulty in that the effect of any random or unrelated impulse applied to one circuit is cancelled, or at least largely modified, by the other circuit or circuits. For example, assuming that the normal current flowing through each circuit is of the order of ten milliamperes when the integrating networks are adjusted so that no signal is applied to the grids of vacuum tubes $V_3$—$V_4$, the total current flowing to the translating device would be of the order of 20 milliamperes and the translating device normally would be adjusted for a zero indication for this current.

Assuming that the instrument was passed over a radio-active substance the radiations from which when converted into current increased the current flowing from each circuit to the translating device from 10 milliamperes to 20 milliamperes for a total current effect of 40 milliamperes flowing to the translation device, a sharp, clear cut change in the translating device would take place over the reaction obtained by the current normally flowing thereto.

Assuming that a series of random impulses is picked up by one circuit and not by the other circuit or circuits, for example, the upper circuit, this series of impulses is amplified and is applied to the grid $V_1$ causing conduction in $V_1$ and resulting in a series of changes in the plate voltage. This series of changes is integrated by the condensor-resistor network $C_9$—$R_{16}$—$R_{18}$—$R_{20}$ to produce a smooth change of grid voltage on $V_3$, and the change in the grid voltage applied to $V_3$ changes the conduction of the tube resulting in a change in the plate current. This change of plate current in $V_3$ changes the screen voltage of $V_3$ and by the parallel connection at the same time changes the screen voltage of screen $V_4$. Both screens have a common power supply at Z through resistance $R_{22}$. This change of screen voltage on $V_4$ changes the plate current through $V_4$ in the opposite direction to the change which took place in $V_3$. Thus, the effect of a series of random impulses generated within one circuit and not within the other circuit, is, therefore, at least substantially reduced by the counterbalancing action of the tubes $V_3$—$V_4$ over the effect of related equal signals fed through both circuits simultaneously. Thus, the difficulty in distinguishing between random or unrelated impulses and the related impulses derived from the radiations emanating from radio-active substances is overcome.

*Power supplies and switches*

Figure 4:
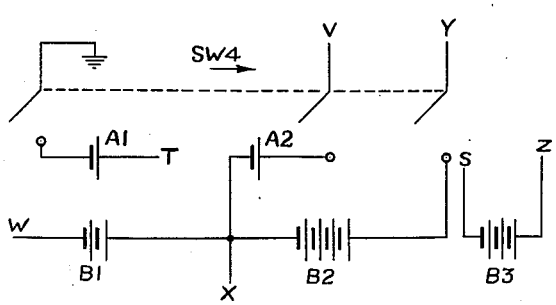
Figure 4 is a wiring diagram of the power supply circuit of the amplifiers.

In the preferred embodiment of the invention described and illustrated herein, the device is operated by battery power supplies as illustrated in Figures 3 and 4. In practice, batteries of the type used in hearing aid devices have been found most satisfactory due to their size and weight, although other types of power supply may be used.

The amplifier power supplies shown in Figure 4 comprise battery A1 which supplies filament voltage of 1½ volts for the filaments of amplifiers 1 and 2, as well as V1 and V2. Battery A2 supplies filament voltage of 1½ volts for filaments of V3 and V4. Battery B1 is a high voltage supply of the order of 67 volts for the amplifiers 1 and 2 through the filter R10 and C8A. The negative return of B1 through R13 to ground is used as a bias control P2 on grid 1 of V1 and V2. B1 also supplies screen voltage for V1 and V2.

Battery B2 supplies high voltage of the nature of 90 volts to the plates of V3 and V4, and through the resistor network R15, P3 and R14 to the plates of V1 and V2. P3 is a potentiometer which is adjustable to control the plate voltage of V1 and V2. B2 also supplies voltage through filter R3 C3 to collector anode D10 of the photo multiplier tube.

Battery B3 is a high voltage power supply in series with voltage from B2 to provide a higher voltage for the screens of V3 and V4.

The operating voltage for the photo multiplier tube is illustrated in Figure 3, and consists of a series of 30 volt batteries in conjunction with a variable resistor P4 which controls the voltage supply to the photo multiplier tube, and a high voltage condenser C17 which acts as a filter across the batteries. R37 is a metering resistor of the order of 10 megs. and is used for metering the circuit.

Referring now to the various switches used in this device, switch SW1 is a sensitivity control to accommodate a wide range of received signals. This switch is ganged, as shown in dotted lines.

SW2 is a ganged switch and is used as follows:

*Position No. 1*

V3 and V4 are in parallel to record the output of amplifier 1.

*Position No. 2*

V3 is connected to amplifier 1, V4 is connected to amplifier 2, and the output of V3 and V4 is recorded on the recorder and meter M, as explained hereinbefore.

*Position No. 3*

This records the output from amplifier 2.

Switch SW3 is a meter selector switch, used as follows:

*Position No. 1*

Meter M is in parallel with the recorder output to give the same proportionate reading as the recorder.

*Position No. 2*

Meter M indicates the magnitude of the high voltage supplied to the photo multiplier tube, Figure 2.

*Positions Nos. 3 and 4*

Meter M is connected to test leads from testing voltages at batteries A1, A2, B1, B2 and B3.

Switch SW4 is a 3 mole off/on switch, and switch SW5 is a push button switch for connecting meter M in position No. 2 of SW3.

The present invention possesses a number of important advantages.

Radiations emanating from radio-active substances may be detected very rapidly and converted into electrical impulses which may be translated into sound or recorded.

A further important advantage is that the rapid rate at which the radiations are detected permits the instrument to be moved rapidly over an area being surveyed for radio-active minerals. Consequently, the instrument may be used with very dependable results through a wide range of speed, ranging from a position at rest to and including the speed of an aeroplane. For example, the instrument may be used by a party working on the ground, or working from a vehicle, or may be employed with an aeroplane in aerial surveying. It has been found to produce dependable results in all its methods of employment.

The instrument has the further advantages in that it may be manufactured relatively inexpensively; it is relatively compact in size and is durable and readily portable.

It will be understood, of course, that modifications may be made in the preferred embodiment of the invention described and illustrated herein without departing from the scope of the invention as defined by the appended claims.

What we claim as new and desire to protect by Letters Patent of the United States is:

1. A coincidence pulse indicating circuit comprising a pair of pulse input circuits, a pair of balanced integrating circuits one for each input circuit, each integrating circuit comprising a normally conducting output tetrode tube having an anode, cathode, control grid and screen grid, each tetrode having its control grid connected with its respective integrating circuit to vary the conductivity of the tetrode upon receipt of a pulse, a common output circuit for said tetrodes, an indicating device connected in the common output circuit to respond to the sum of the outputs of the tetrodes, and a source of positive potential connected through a common potential-dropping resistance to both the screen grids in common, whereby receipt of an impulse by one integrating circuit will vary the conductivity of its respective tetrode and effect a variation in the potential of the screen grid of the other tetrode to vary its conductivity in the opposite sense to that of the first tetrode.

2. A coincidence pulse indicating circuit comprising a pair of pulse input circuits, a pair of balanced integrating circuits one for each pulse input circuit, each integrating circuit comprising an input relay tube normally nonconducting and rendered conducting during receipt of a pulse, and a normally conducting output tetrode having an anode, cathode, control grid and screen grid, said control grid connected to the output of said relay tube to vary the conductivity of the output tetrode upon receipt of a pulse by the relay tube, together with electrical indicating means and a source of current connected in series with each other through the anode-cathode output circuits of both said tetrodes in parallel to respond to the sum of the currents passing through both tetrodes, said screen grids being connected to each other and through a common potential-dropping resistance to a source of positive potential the minus side of which source is connected to both said cathodes, whereby a variation in conductivity of one of said tetrodes will vary the voltage on its screen and therefore vary the voltage on the other screen to which it is connected resulting in a variation in conductivity of the other tetrode opposite to that of the said one tetrode.

ROBERT GORDON MacKAY.
GEORGE HARRISON McLAUGHLIN.

REFERENCES CITED

The following references are of record in the file of this patent:

UNITED STATES PATENTS

| Number | Name | Date |
|---|---|---|
| 2,573,823 | Barghausen et al. | Nov. 6, 1951 |

OTHER REFERENCES

Necleonics, October 1948, pp. 48–49 and 58.
Atomic Energy Commission Document — AECD—2203, pp. 7–9, June 30, 1948.